United States Patent [19]
Okuda et al.

[11] Patent Number: 5,493,118
[45] Date of Patent: Feb. 20, 1996

[54] THERMAL IMAGE DETECTING SYSTEM

[75] Inventors: Isamu Okuda; Yasuhito Mukai, both of Otsu; Sátoshi Tokushige, Kusatsu; Morihiro Nakayama, Shiga, all of Japan

[73] Assignee: Matsushita Electric Industrial Co., Ltd., Osaka, Japan

[21] Appl. No.: 120,371

[22] Filed: Sep. 14, 1993

[30] Foreign Application Priority Data

Sep. 17, 1992 [JP] Japan .................... 4-247469

[51] Int. Cl.$^6$ .................. G01J 5/02; G01J 5/06; G01J 5/08
[52] U.S. Cl. ............ 250/338.3; 250/332; 250/334; 250/351
[58] Field of Search .............. 250/338.3, 332, 250/334, 349, 351; 348/164, 165, 166; 358/113; 374/124

[56] References Cited

U.S. PATENT DOCUMENTS

| | | |
|---|---|---|
| 3,350,562 | 10/1967 | Flint . |
| 3,536,917 | 10/1970 | Desvignes . |
| 3,646,267 | 2/1972 | Tompsett ................ 348/165 |
| 4,481,535 | 11/1984 | Hodd et al. ............ 348/165 |
| 4,804,844 | 2/1989 | Lee ..................... 250/338.3 |
| 5,001,657 | 3/1991 | Yagura et al. . |
| 5,262,647 | 11/1993 | Kumada ................. 250/351 |
| 5,283,551 | 2/1994 | Guscott ............... 250/342 X |

FOREIGN PATENT DOCUMENTS

| | | |
|---|---|---|
| 0098402A1 | 1/1984 | European Pat. Off. . |
| 0233711A2 | 8/1987 | European Pat. Off. . |
| 6216074 | 8/1982 | Japan ................. 374/124 |
| 1-291128 | 11/1989 | Japan ................. 250/349 |
| 2-285223 | 11/1990 | Japan ............... 250/338.3 |
| 4-175623 | 6/1992 | Japan ................. 374/124 |
| 2150387 | 6/1985 | United Kingdom ........ 358/113 |

OTHER PUBLICATIONS

Patent Abstracts of Japan vol. 011, No. 230 (P–599) 28 Jul. 1987 & JP–A–62 044 634 (Fujitsu Ltd.) 26 Feb. 1987.

Primary Examiner—Carolyn E. Fields
Assistant Examiner—Edward J. Glick
Attorney, Agent, or Firm—Stevens, Davis, Miller & Mosher

[57] ABSTRACT

A thermal image detecting system includes a moving part having pyroelectric thermal detection element, a chopper for opening/closing a path of infrared rays and a chopper temperature detection element, a rotating section for rotating the moving part, a drive control section for driving the chopper and the rotating section, a band amplifier for amplifying a detection signal from the pyroelectric thermal detection element, a timing output section for outputting a signal synchronous with an opening/closing operation of the chopper, a peak detection section for successively holding the maximum value and the minimum value of a signal from the band amplifier, and an operational processing section for performing operational processing on a thermal image signal on the basis of a difference between the maximum value and the minimum value or a difference between a reference signal from the band amplifier in a closed state of the chopper and the maximum value, or the minimum value and the temperature of the chopper.

21 Claims, 4 Drawing Sheets

THERMAL IMAGE DETECTING SYSTEM

BACKGROUND OF THE INVENTION

The present invention relates to a thermal image detecting system using a pyroelectric type thermal detection element provided, for example, for detection of room temperature distribution in a house or for detection of the behavior of a human body.

The conventional non-contact temperature measuring system includes a quantum type infrared ray sensor or a thermal infrared ray sensor. The quantum type infrared ray sensor is characterized in that it has a high sensitivity and hence a rapid response speed. However, the sensor must be cooled (to about −200° C.). Therefore, this sensor is unsuitable for consumer use. On the other hand, the thermal infrared ray sensor has relatively low sensitivity and a slow response speed, but does not have to be cooled. Therefore, this sensor has been sold in the consumer market. In particular, a pyroelectric type infrared ray sensor using the pyroelectric effect is widely used.

The pyroelectric infrared ray sensor has a differential change output characteristic so that an output is generated only when the incident temperature changes. In the pyroelectric infrared ray sensor hitherto employed, a Fresnel lens using a polyethylene resin and having an angle of view with a light distribution characteristic is provided on the entire surface of the sensor. When a human body moves, the radiation temperature of the human body is inputted to the sensor as a time changing input in accordance with the light distribution characteristic. An output of the pyroelectric infrared ray sensor is provided in synchronism with the time changing input, thereby making it possible to detect the human body. On the other hand, when a human body is in a stationary state, the detection of the human body is not possible since a time changing input to the sensor is not provided.

Also, other known types of sensors are pyroelectric infrared sensors which are made of ceramics and point temperature sensors which use a chopper. However, since these sensors have low sensitivity and a very slow response speed, it is not possible to detect large amounts of temperature data within a period of one or two seconds. Further, a system has been considered in which pyroelectric infrared sensors are two-dimensionally arranged to achieve a temperature distribution measuring means.

SUMMARY OF THE INVENTION

In the conventional method, although the detection of a moving human body is possible, it is not possible to detect either a human body's position or a stationary human body. Further, the measurement of the temperature of an object other than a human body (e.g., the measurement of a temperature distribution of a wall or floor in a room) is impossible. Also, the conventional system, in which pyroelectric infrared sensors are two-dimensionally arranged, has the problem that the system construction becomes complicated.

One object of the present invention is to provide a system having a wide angle of view in which a thermal image can be detected with a relatively simple system construction. Another object of the present invention is to improve the performance of a thermal image detecting system by performing processing for highly-precise detection of a differential change characteristic outputted by a pyroelectric infrared ray sensor.

To that end, a thermal image detecting system according to one aspect of the present invention comprises a moving part including a pyroelectric thermal detection element, a chopper for opening/closing a path of infrared rays and a chopper temperature detection element, a rotating section for rotating the moving part around a predetermined rotation axis, a drive control section for driving the chopper and the rotating section, a band amplifier for amplifying a detection signal from the pyroelectric thermal detection element, a timing output section for outputting a signal synchronous with an opening/closing operation of the chopper, a peak detection section for successively storing the maximum value and the minimum value of a signal from the band amplifier in accordance with an output of the timing output section, and an operational processing section for performing operational processing of a thermal image signal on the basis of (1) a difference between the maximum value and the minimum value and (2) a temperature signal of the chopper temperature detection element.

According to this thermal image detecting system, a thermal image detecting system is realized having a small size and a simple construction in which a detection signal from the pyroelectric thermal detection element is amplified while rotating the moving part including the pyroelectric thermal detection element and the chopper so that the maximum value and the minimum value of the detection signal are detected at a fixed timing for each opening/closing operation of the chopper and a difference between the maximum value and the minimum value is operationally processed to obtain a thermal image signal.

In the thermal image detecting system, a reference signal detection section for detecting a signal from the band amplifier in a closed state of the chopper may be provided so that the operational processing section performs operational processing on a thermal image signal on the basis of a difference between the maximum value or the minimum value from the peak detection section and the reference signal from the reference signal detection section. Thus, the thermal image signal can be obtained by operational processing based on a difference between a reference signal in a constant closed state of the chopper and the maximum value or the minimum value for each opening/closing operation of the chopper. Accordingly, the problem associated with a response speed of the band amplifier to amplify a detection signal from the pyroelectric thermal detection element can be moderated, thereby making it possible to improve the degree of freedom of design of a band amplifier and the precision of detection of a thermal image.

In the thermal image detecting system, a plurality of pyroelectric thermal detection elements may be arranged in the form of a row (or column) as a pyroelectric thermal detection element group, with the number of band amplifiers being the same as the number of pyroelectric thermal detection elements, thereby detecting a two-dimensional thermal image. In this case, since a two-dimensional thermal image signal can be obtained in lieu of a one-dimensional thermal image signal, the detection capability of temperature distribution, human body position and so on is greatly improved.

In the thermal image detecting system, an input signal of the timing output section may be a chopper driving signal from the drive control section for driving the chopper. In this case, a simple construction becomes possible such that timings for detection of the maximum value and the minimum value for each opening/closing operation of the chopper are taken by the chopper driving signal.

In the thermal image detecting system, an opening/closing detection sensor for detecting the actual opening/closing of the chopper may be provided in the moving part so that a detection signal from the opening/closing detection sensor is used as an input signal of the timing output section. In this case, since the opening/closing detection sensor is provided to detect the actual opening/closing of the chopper, the detection precision of a signal from the pyroelectric thermal detection element can be improved and the detection of a failure of the chopper becomes possible.

In the thermal image detecting system, closing means for bringing the chopper to a closed state at the time of no supply of current to the chopper may be provided. In this case, since the chopper is always brought to the closed state, the pyroelectric thermal detection element or the pyroelectric thermal detection element group is prevented from being irradiated with unnecessary infrared rays in a period of time when the detection of a thermal image signal is not conducted. Further, when the reference signal detection section detects the reference signal, the supply of current for obtaining a closed state of the chopper becomes unnecessary. Therefore, power savings can be attained, and unnecessary temperature rise of the chopper and its vicinity can be reduced.

In the thermal image detecting system, the drive control section may be provided with a first timer and a second timer. The drive control section maintains the chopper at a closed state during the period of the first timer and thereafter causes the reference signal detection section to detect a reference signal in the period of the second timer. After the completion of the period of the second timer, the moving part is rotated and an opening/closing operation of the chopper is performed. In this case, since the detection of the reference signal in the constant closed state of the chopper is made before the moving part is rotated, it is possible to avoid a temperature rise of the chopper and its vicinity, the noise influence caused by the rotation operation of the moving part, and so on. As a result, the precision of thermal image detection can be improved.

In the thermal image detecting system, the period of the first timer may be longer than at least two times the opening/closing period of the chopper. In this case, since the chopper is placed at the above-mentioned constant closed state in a period of time longer than at least two times the opening/closing period of the chopper, an output signal from the band amplifier can be stabilized entirely, thereby making it possible to detect the reference signal with a higher precision.

In the thermal image detecting system, the reference signal detection section may be provided with averaging means which receives a plurality of signals from the band amplifier in a closed state of the chopper to calculate an average value of the plurality of signals inputted thereto. In this case, since the detection of the reference signal is conducted a plurality of times to determine the average value, an effect is provided that the influence of external noises on the reference signal is reduced greatly.

In the thermal image detecting system, a construction may be employed in which the timing output section provides an output in a predetermined period of time in the vicinity of an instant of time of change from a closed state of the chopper to an opened state thereof, and the peak detection section includes a polarity detection section so that the maximum value or the minimum value is detected in accordance with the detected polarity. In this case, since the detection of the maximum value or the minimum value is conducted in the vicinity of the instant of time of change from the closed state of the chopper to the opened state thereof, the detection of the maximum value or the minimum value can be performed precisely and in a short time, thereby enhancing the degree of freedom of design concerning signal processing time.

In the thermal image detecting system, the peak detection section may be constructed by a pair of analog peak hold sections and a time instant detection section for the maximum value and the minimum value. Also, the peak detection section may be constructed by an A/D conversion section, a pair of digital peak hold sections and a time instant detection section. Thus, the peak detection section can be constructed by either an analog circuit or a digital circuit. Thus, there is an effect that one of the analog circuit and the digital circuit can be selected properly to rationalize the construction of the whole system.

In the thermal image detecting system, there may be employed a construction in which an average value between the maximum or minimum value detected in the digital peak hold sections and the previous maximum or minimum value is sequentially determined. Also, the peak detection section can be constructed by an A/D conversion section, an average value holding section for obtaining an average value between the preceding output value of the A/D conversion section and the present output value thereof and holding the average value, and a pair of digital peak hold sections for detecting the maximum value and the minimum value of an output value of the average value holding section and holding these values, respectively. In the case where the digital peak hold sections are used, two means for determining the maximum value or the minimum value by calculating an average value of values before and after are possible. When peak noise, such as power supply noise, external noise or the like, enter a signal from the pyroelectric thermal detection element or the band amplifier, the influence of such noise can be reduced through the averaging process. In other words, the averaging process contributes to the detection of a thermal image signal with high precision.

As is apparent from the foregoing, the present invention provides excellent advantages as an industrial product. That is, the present invention provides the effects that a one-dimensional or two-dimensional thermal image can be detected with a relatively simple construction and with high precision and the invention can be used widely for the detection of temperature distribution, human bodies, the position or behavior of the human body, and so on, with a low-cost system.

DESCRIPTION OF THE PREFERRED EMBODIMENTS

Figure 1:
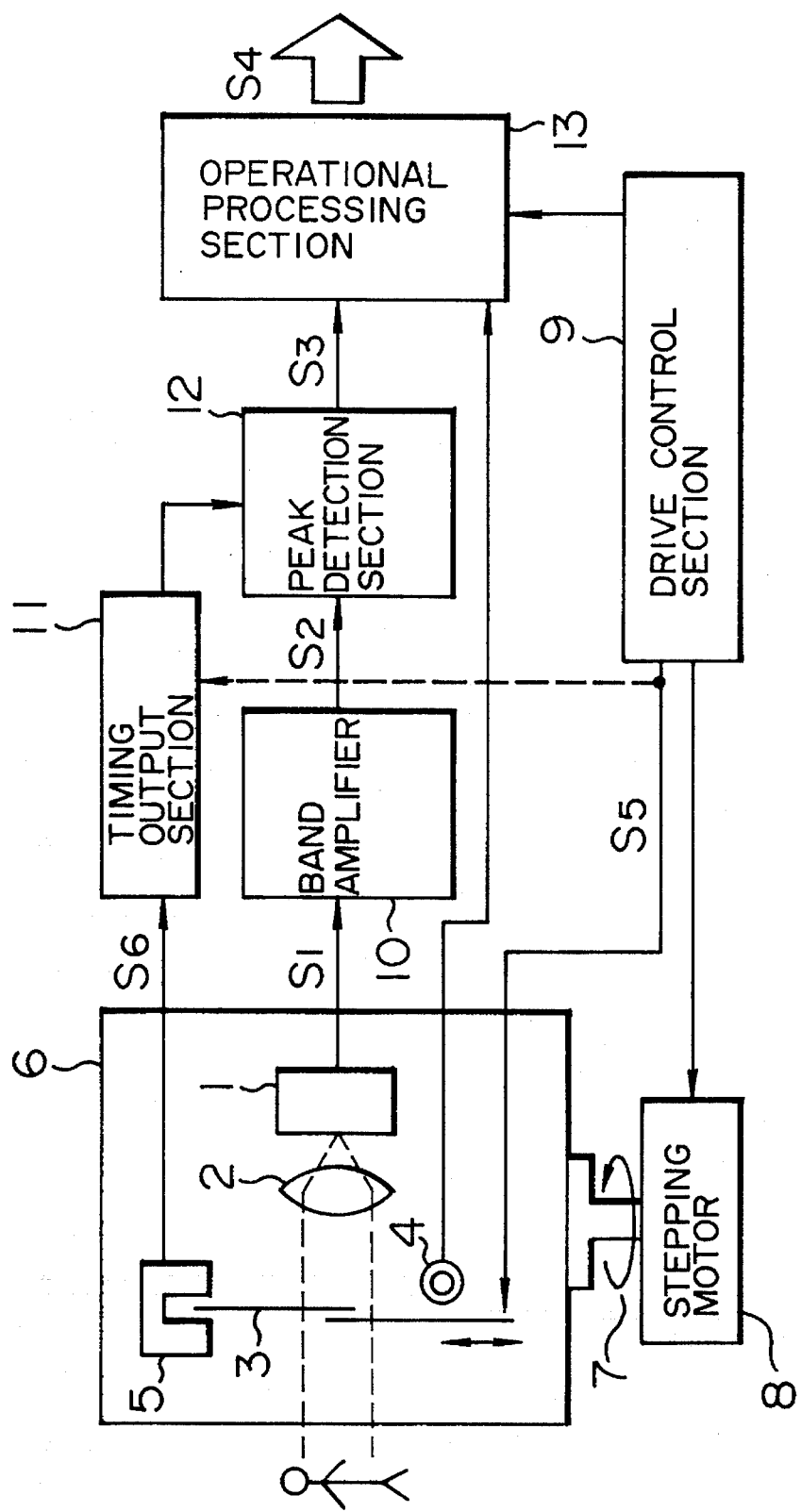
FIG. 1 is a block diagram showing the construction of a thermal image detecting system according to an embodiment of the present invention.

A thermal image detecting system according to the present invention will now be explained in reference to the accompanying drawings.

First, the construction of a thermal image detecting system according to an embodiment of the present invention will be explained by use of FIG. 1. In the figures, reference numeral 1 designates a pyroelectric thermal detection element which has an electric characteristic which changes in response to infrared rays, and numeral 2 designates an infrared ray transmitting lens provided on a front surface of the pyroelectric thermal detection element 1 for transmitting infrared rays from a desired area to the thermal detection element 1. Numeral 3 designates a chopper for opening/closing a path of infrared rays from an object to be detected (for example, a human body) to the pyroelectric thermal detection element 1, and numeral 4 designates a chopper temperature detection element for detecting the temperature of the chopper 3. Numeral 5 designates an opening/closing detection sensor for detecting the actual opening/closing operation of the chopper 3. These constituent elements 1 to 5 form a moving part 6. Numeral 7 designates a rotating section for rotating the moving part 6 around a predetermined rotation axis in a predetermined range, for example, a range of 150°. The rotating section 7 includes a stepping motor 8 or the like. Numeral 9 designates a drive control section for driving the chopper 3 and the stepping motor 8, and numeral 10 designates a band amplifier which receives an input of a minute detection signal S1 from the pyroelectric thermal detection element 1 and has a maximum amplification degree, for example, about 60 to 80 dB, in the vicinity of a frequency equal to the opening/closing frequency of the chopper 3. Numeral 11 designates a timing output section which is inputted with an opening/closing detection signal S6 from the opening/closing detection sensor 5 to output the timing of detection of an output signal S2 of the band amplifier 10, and numeral 12 designates a peak detection section for successively holding (storing) the maximum value and the minimum value of the output signal of the band amplifier 10 for each opening/closing operation of the chopper 3. Numeral 13 designates an operational processing section which is inputted with an output signal S3 from the peak detection section 12 to obtain a difference between the maximum value and the minimum value and is inputted with a temperature detection signal from the chopper temperature detection element 4 to perform operation processing on a thermal image signal on the basis of the temperature detection signal and the difference between the maximum value and the minimum value.

Next, explanation will be made of the operation of the system shown in FIG. 1. FIG. 2 is a timing chart for explaining the operation of the construction shown in FIG. 1. First, the drive control section 9 outputs driving signals to the chopper 3 and the rotating section 7 so that the moving part 6 is rotated, for example, by about 0.3° at every 4 ms and the chopper 3 is opened/closed, for example, at 32 Hz. The chopper driving signal S5 is a signal which has an opening/closing period of Tc and is in the opened state about half the time and the closed state about half the time. The opening/closing detection sensor 5 detects the opening/closing operation of the chopper 3 to output an opening/closing signal S6 as shown in FIG. 2. The actual operation of the chopper 3 has a response delay of Td for the chopper driving signal. In accordance with the opening/closing operation of the chopper 3, the pyroelectric thermal detection element 1 is inputted with the temperature of the chopper 3 when the chopper 3 is in a closed state and with the temperature of an object, such as a human body to be detected, when the chopper 3 is in an opened state. The pyroelectric thermal detection element 1 continuously provides as a detection signal S1 a differential change output which is substantially proportional to a differential temperature $\Delta Q$ (which is equal to the temperature of the object to be detected minus the temperature of the chopper 3). The band amplifier 10 amplifies the detection signal S1 to provide an output signal S2 as shown in FIG. 2. The output signal S2 has a characteristic as shown by a solid line in FIG. 2 when the differential temperature $\Delta Q$ is positive and a characteristic as shown by a broken line when the differential temperature $\Delta Q$ is negative. In the output signal S2 of the band amplifier 10, a difference between the maximum value V1 and the minimum value V2 (i.e. V1–V2) of the output signal S2 in a period K1' corresponding to the actual opening/closing operation period of the chopper (e.g. period K1 in FIG. 2) is substantially proportional to the differential temperature $\Delta Q$. A period K2' corresponds to a period K2. The maximum value V1 (or the minimum value V1 when $\Delta Q<0$) appears in the vicinity of an instant of time t1 at which the chopper 3 is brought from its opened state to its closed state, and the minimum value V2 (or the maximum value V2 when $\Delta Q<0$) appears in the vicinity of an instant of time t2 at which the chopper 3 is brought from its closed state to its opened state.

The timing output section 11 is inputted with the opening/closing detection signal S6 from the opening/closing detection sensor 5 to provide an output to the peak detection section 12 during a time Tj after the lapse of a time Ti from the point of time at which the chopper 3 is brought from its closed state to its opened state, that is, for a time corresponding to the period K1'. The times Ti and Tj are selected such that the time Tj is shorter than the opening/closing period Tc and is in a range in which the detection of the maximum value V1 and the minimum value V2 of the output signal S2 is sufficiently possible. In the period K1 outputted by the timing output section 11, the maximum value V1 and the minimum value V2 are detected and held by the peak detection section 12 and are supplied as an output signal S3 to the operational processing section 13. The operational processing section 13 determines a differential temperature $\Delta Q$ in accordance with the equation $\Delta Q = k(V1-V2)$ (where k is a predetermined constant) and obtains the temperature Qa of the object to be detected in accordance with the relation $Qa = Qc + \Delta Q$ by use of a chopper temperature Qc inputted from the chopper temperature detection element 4.

The timing output section 11 and the peak detection section 12 repeat a similar operation for each opening/closing operation of the chopper 3 and the operational processing section 13 successively determines the temperature Qa of the object to be detected. When the rotation of the moving part 6 over a predetermined range is completed, data of a series of temperatures Qa over the entire area or a thermal image signal S4 is outputted to the exterior. The thermal image signal S4 includes the temperatures of a wall surface in a detection area or information regarding where a human body is located and is used for radiation temperature detection, human body detection or the like by external processing.

Figure 3:
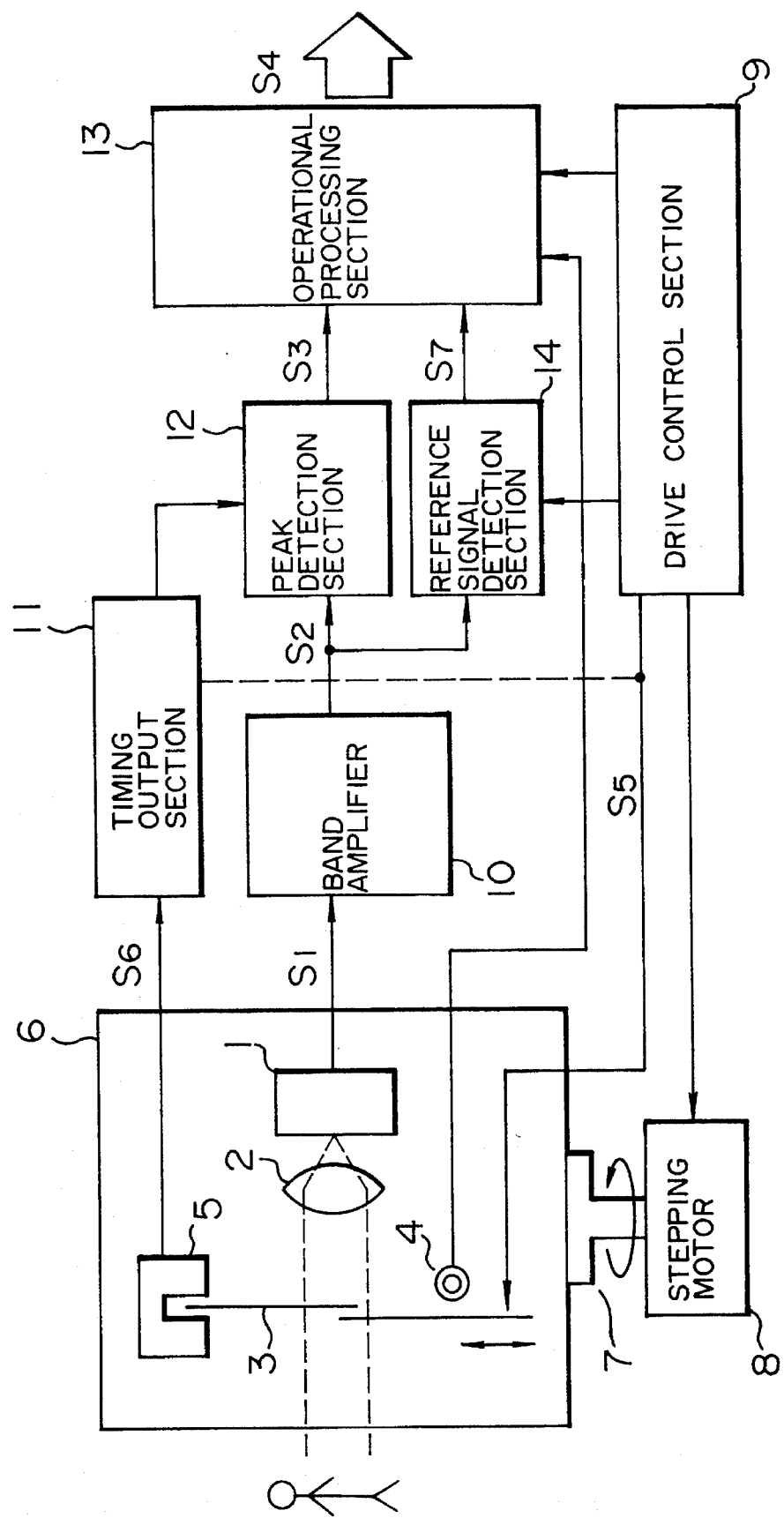
FIG. 3 is a block diagram showing the construction of a thermal image detecting system according to another embodiment of the present invention.

FIG. 3 shows another embodiment of the present invention. In the figure, reference numeral 14 designates a reference signal detection section which detects and holds a signal from the band amplifier 10 in a period of time when the chopper 3 is maintained in a closed state by the drive control section 9. The detected reference signal S7 is outputted to the operational processing section 13. In FIG. 3, the same reference numerals as those used in FIG. 1 designate constituent elements which are the same as, or correspond to, those shown in FIG. 1.

Figure 4:
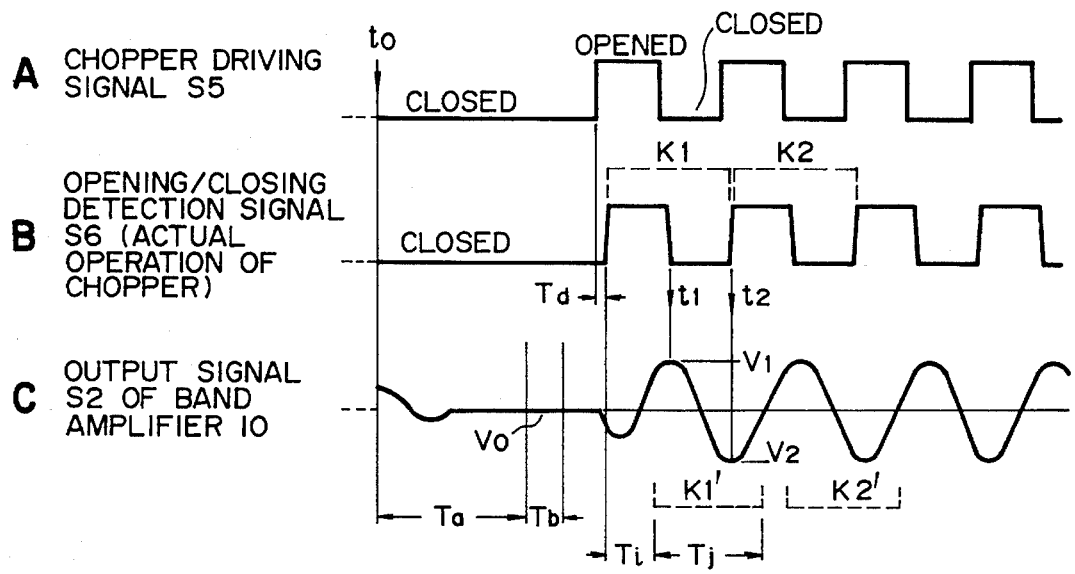
FIG. 4 is a timing chart for explaining the operation of the thermal image detecting system shown in FIG. 3.

Next, explanation will be made concerning the operation of the embodiment shown in FIG. 3. FIG. 4 is a timing chart for explaining the operation of the construction shown in FIG. 3. Before outputting driving signals to the chopper 3 and the rotating section 7, the drive control section 9 outputs a chopper driving signal S6 during a time Ta from an instant of time t0 to maintain the chopper 3 in a closed state. The closed state of the chopper 3 is maintained during a time Tb after the lapse of time Ta. In this case, the amplitude of an output signal S2 of the band amplifier 10, irrespective of the state of the signal S2 before the instant of time t0, becomes zero not later than the lapse of the time Ta so that the signal S2 assumes a certain constant output level V0. The obtained state is continued during the time Tb. The reference signal detection section 14 is inputted with the output signal S2 in the time Tb so that the value of the output signal S2 is held as a reference signal S7. Thereafter, the drive control section 9 outputs driving signals to the chopper 3 and the rotating section 7 to drive the chopper and the moving part 6, thereby performing an operation similar to that explained in conjunction with FIG. 2. An output signal S3 from the peak detection section 12 and the reference signal S7 from the reference signal detection section 14 are inputted to the operational processing section 13. The operational processing section 13 uses the maximum value V1 or minimum value V2 of the output signal S3 of the peak detection section 12 in the vicinity of an instant of time t2 and V0 of the reference signal S7 to determine a differential temperature $\Delta Q$ in accordance with the equation $\Delta Q = k' \cdot (V0-V2)$ (where k' is a predetermined constant) and further uses a chopper temperature Qc inputted from the chopper temperature detection element 4 to determine the temperature Qa of an object to be detected in accordance with the relation $Qa = Qc + \Delta Q$.

Figure 2:
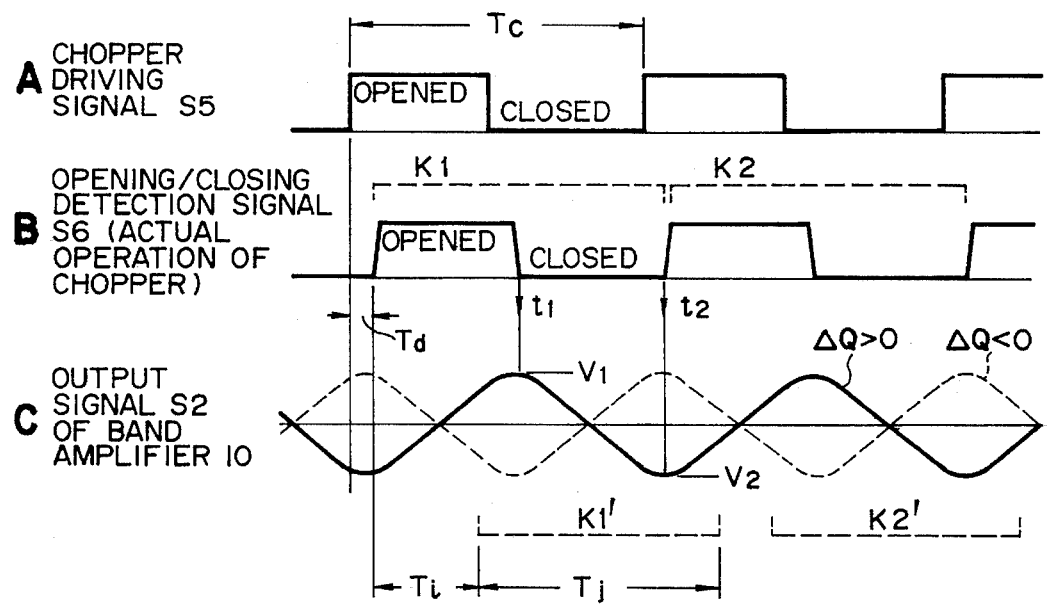
FIG. 2 is a timing chart for explaining the operation of the thermal image detecting system shown in FIG. 1.

A similar operation is repeated from each opening/closing operation of the chopper 3 as in the embodiment shown in FIG. 1 so that the operational processing section 13 successively determines the temperature Qa of the object to be detected.

Figure 5:
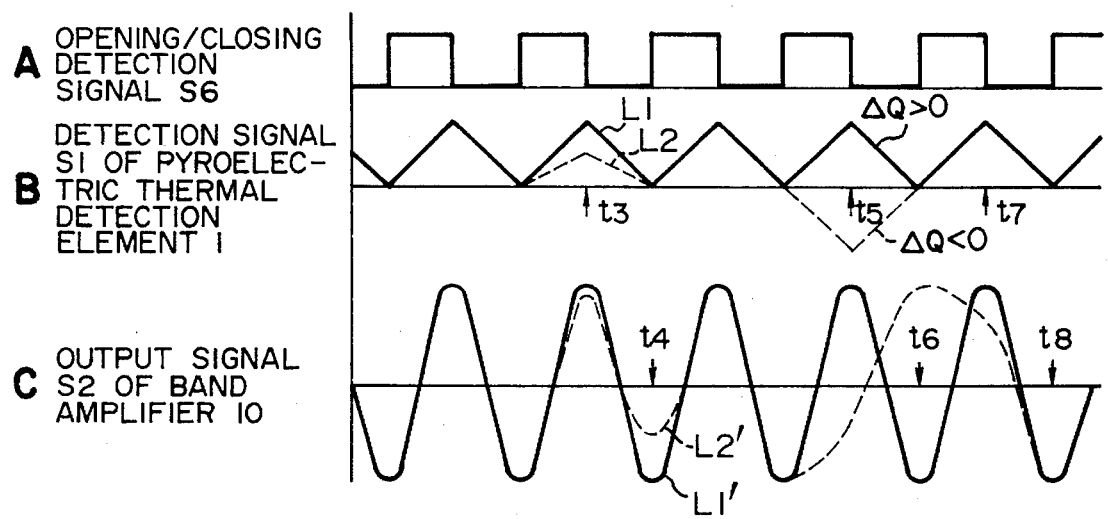
FIG. 5 is a timing chart for explaining the operation of a thermal image detecting system according to a further embodiment of the present invention.

The reason why V2 of V1 and V2 of the output signal S3 is used in the equation of $\Delta Q = k' \cdot (V0-V2)$ used by the operational processing section 13, is that it can generally be said from the response characteristic of the band amplifier 10 that V2 is superior to V1 in proportional relation with a temperature signal detected by the pyroelectric thermal detection element 1. This will be explained using FIG. 5. In the case where a detection signal S1 from the pyroelectric thermal detection element 1 detects a fixed differential temperature, as shown by characteristic L1 indicated by a solid line in FIG. 5, an output signal S2 of the band amplifier 10 takes an output form as shown by characteristic L1'. In the case where the detection signal S1 has a characteristic L2 shown by a broken line, the output signal S2 of the band amplifier 10 takes a characteristic L2'. Provided that the value of the characteristic L2 is one-half that of the characteristic L2 at an instant of time t3, the output signal S2 cannot sufficiently follow the detection signal S1 in the vicinity of the instant of time t3 due to a response delay, but exhibits a peak corresponding substantially to the detection signal S1 at an instant of time t4. Also, when the differential temperature $\Delta Q$ becomes reverse with respect to the characteristic L1 as at an instant of time t5, that is, $\Delta Q$ becomes negative, the output signal S2 has a considerably poor degree of correspondence to the detection signal S1 in the vicinity of the instant of time t5, but exhibits a peak substantially corresponding to the differential temperature $\Delta Q$ at an instant of time t6. When $\Delta Q$ becomes positive again at an instant of time t7, the output signal S2 exhibits a peak substantially corresponding to the differential temperature $\Delta Q$ at an instant of time t8. Accordingly, it is apparent from the foregoing that in the case where the value of the differential temperature differs greatly in a detection rotation range and in particular in the case where the polarity of the differential temperature is different, the maximum value V1 or minimum value V2 of the output signal S2 of the band amplifier 10, which value is a peak value in the vicinity of an instant of time when the chopper is brought from a closed state to an opened state, is superior in a proportional relation with the differential temperature to be detected.

From the above, the value of (V0–V2) is generally smaller than that of (V1–V2) obtained in the case of FIG. 2 (about one-half in the case where a differential temperature is fixed) but provides a differential temperature $\Delta Q$ which has a higher precision as compared with that obtained in the case of FIG. 2.

In the drive control section 9, the time Ta and the time Tb can be realized easily by providing a first timer and a second timer which operates after the completion of the period of the first timer. If the response characteristic of the band amplifier 10 is considered, it is preferable that the time Ta is made longer than a time from the point of time when the chopper 3 is brought to a closed state and to the point of time when the output signal S2 of the band amplifier 10 becomes completely zero. In general, it is enough for time Ta to be longer than two times the opening/closing period Tc of the chopper 3. Noise resistance can be improved in such a manner that when the output signal S2 of the band amplifier 10 is inputted, the reference signal detection section 14 reads the output signal S2 a plurality of times to determine an average value which is in turn provided as a reference signal S7.

In the present embodiment, the operational processing section 13 uses V2 of the output signal S3 of the peak detection section 12, but does not use V1 thereof. Accordingly, a construction may be used in which the maximum value or the minimum value detected by the peak detection section 12 is only V2. For example, the timing output section 11 is constructed such that the period K1' in FIG. 4 when the peak detection section 12 detects the maximum value or the minimum value of the output signal S2 of the band amplifier 10 is only in the vicinity of an instant of time t1, that is, the time Ti is made long and the time Tj is short. Also, the peak detection section 12 is provided with a polarity detecting section inputted with a signal from the band amplifier 10 for detecting the polarity of the signal from the band amplifier 10 so that the maximum value is held when the polarity is positive and the minimum value is held when the polarity is negative. With such a construction, it is possible to detect the maximum value or minimum value V2 accurately.

In the foregoing, the thermal image detecting system according to the present invention has been explained on the basis of the embodiments shown in FIGS. 1 and 3. However, other constructions as mentioned in the following text are possible.

Figure 6:
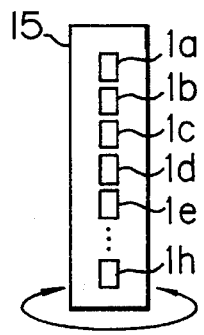
FIG. 6 ia a diagram showing an example of the construction a pyroelectric thermal detection element group.

In the foregoing embodiments shown in FIGS. 1 and 3, explanation has been made in conjunction with the case where the pyroelectric thermal detection element 1 is singular. However, a construction can be employed, as shown in FIG. 6, in which a plurality of (for example, eight) pyroelectric thermal detection elements 1a–1h are arranged in the form of a row (or column) to provide a pyroelectric thermal detection element group 15 so that the elements in the row (or column) form are approximately perpendicular to the rotation direction of the moving part 6 and band amplifiers and peak detection sections (and reference signal detection sections in the case of FIG. 3) are provided corresponding to the plurality of pyroelectric thermal detection elements 1a–1h in the same number as those elements, thereby providing a multi-channelling system so that a two-dimensional thermal image signal is obtained as the thermal image signal S4. Provided that (1) the number of elements in the pyroelectric thermal detection element group 15 is eight, (2) the angle of view by the infrared ray transmitting lens 2 is 80°, (3) a horizontal rotation range of the moving part 6 is 150° and (4) the chopper 3 is opened/closed 64 times at the opening/closing frequency of 32 Hz, a two-dimensional thermal image signal including an area of 80° in an up/down direction and 150° in a right/left direction and including eight pixels in a vertical direction ×64 pixels in a horizontal direction can be obtained in about two seconds.

The opening/closing detection sensor 5 in the embodiments shown in FIG. 1 and 3 detects the actual opening/closing operation. Therefore, failure of the chopper 3 can be detected simultaneously if it is detected whether or not the opening/closing detection signal S6 of the opening/closing detection sensor 5 is normal by the timing output section 11. Also, an approximately similar operation is possible even if the opening/closing detection sensor is not used in order to simplify the system and the chopper driving signal S6 is instead used as an input signal of the timing output section 11. In this case, considering a response delay time for the chopper driving signal S5 of the chopper 3 (that is, Td in FIGS. 2 and 4), Tj+Td is used in lieu of Tj.

Although the opening/closing of the chopper 3 in the embodiments shown in FIGS. 1 and 3 is controlled by the chopper driving signal S5 of the drive control section 9, the chopper can be provided with closing means for closing a path of infrared rays to the pyroelectric thermal detection element at the time that no current is being supplied to the chopper 3. In this case, it is possible to prevent an unnecessary infrared ray signal from entering the pyroelectric thermal detection element 1 in a period of time when the detection of the thermal image is not conducted. Also, when the reference signal detection section 14 detects the reference signal S7 in the embodiment of FIG. 3, the supply of current to the chopper 3 by the drive control section 9 to bring the chopper 3 into a closed state becomes unnecessary, thereby attaining power savings and the prevention of unnecessary temperature rise. Further, the time Ta in FIG. 4 can be shortened as a result, thereby contributing to the shortening of a time of repetition of the detection of a thermal image.

In the embodiments shown in FIGS. 1 and 3, the chopper temperature detection element 4 for detecting the temperature of the chopper 3, that is, a reference temperature, is provided in the moving part 6. This chopper temperature detection element 4 is necessary in the case where, when the thermal image signal S4 is to be obtained, the temperature of an object to be detected itself is determined and a small change in characteristic of a signal detected by the pyroelectric thermal detection element 1 due to a change in reference temperature is corrected. However, in the case where a thermal image based on a temperature $\Delta Q$ of a difference from the chopper temperature suffices, the chopper temperature detection element 4 can be omitted.

In addition to the above, the peak detection section 12 in the embodiments shown in FIGS. 1 and 3 can be constructed as follows.

The peak detection section 12 can be constructed by a pair of analog peak hold sections for holding the maximum value and the minimum value (or V1 and V2) of an output signal of the band amplifier 10 respectively and a time instant detection section for detecting a temporal relationship in sequence between the detection of the maximum value and the detection of the minimum value (or a relationship in sequence between t1 and t2) so that the outputs of the pair of analog peak hold sections and the output of the time instant detection section are inputted to the operational processing section 13 to determine a differential temperature $\Delta Q$. Alternatively, the peak detection section 12 may be constructed by an A/D conversion section for sequentially converting an output signal of the band amplifier 10 into a digital value, a pair of digital peak hold sections for holding the digital value, outputted by the A/D conversion section, as the maximum value when the digital output value is larger than the preceding values and as the minimum value when the digital output value is smaller than the preceding values, and a time instant detection section for detecting a temporal relationship in sequence between the detection of the maximum value and the detection of the minimum value so that the output of the A/D conversion section, the outputs of the pair of digital peak hold sections and the output of the time instant detection section are inputted to the operational processing section 13 to determine a differential temperature $\Delta Q$. Thus, the peak detection section 12 can be constructed by either an analog circuit or a digital circuit. The one of the analog circuit and the digital circuit that should be used in the construction of the overall system can be selected properly.

The pair of digital peak hold sections mentioned above can be constructed to hold an average value between the output value of the A/D conversion section and the previous maximum or minimum value as a new maximum value when the output value of the A/D conversion section is larger than the previous maximum value and as a new minimum value when the output value of the A/D conversion section is smaller than the previous minimum value. Also, the peak detection section 12 can be constructed by an A/D conversion section for sequentially converting an output signal of the band amplifier 10 into a digital value, an average value holding section for operating an average value between the preceding output value of the A/D conversion section and the present output value thereof and holding the average value, a pair of digital peak hold sections for detecting the maximum value and the minimum value of an output value of the average value holding section and holding them, respectively, and a time instant detection section for detecting a temporal relationship in sequence between the detection of the maximum value and the detection of the minimum value. Each of the two means performing the averaging process as mentioned above brings about a small detection error from the ideal maximum value and minimum value but provides an effect that the influence of noises such as power supply noises, in particular, and peak noises at the time of detection, can be reduced greatly, thereby enhancing the practical precision of detection.

We claim:

1. A thermal image detecting system comprising:
   (a) a moving part including
      (i) a pyroelectric thermal detection element having an electric characteristic which changes in response to infrared rays for generating a first temperature detection signal,
      (ii) a chopper for opening/closing a path along which infrared rays from an object to be detected reach said pyroelectric thermal detection element, and
      (iii) a chopper temperature detection element for detecting a temperature of said chopper to produce a second temperature detection signal which represents the detected temperature of said chopper;
   (b) rotation means for rotating said moving part about a predetermined rotation axis;
   (c) a drive control section for generating a chopper driving signal to drive said chopper and for generating a rotation means driving signal to drive said rotation means;
   (d) a band amplifier for amplifying said first temperature detection signal from said pyroelectric thermal detection element;
   (e) timing output means for outputting a synchronized timing signal which is synchronous with an opening/closing operation of said chopper, said timing output means comprising means, receiving said chopper driving signal from said drive control section, for outputting said synchronous timing signal;
   (f) a peak detection section for holding a maximum value and a minimum value of said first temperature detection signal amplified by said band amplifier during a time interval determined by said synchronized timing signal; and
   (g) an operational processing section for producing a thermal image signal by performing operational processing with said second temperature detection signal and a difference between said maximum value and said minimum value.

2. A thermal image detecting system according to claim 1, wherein said moving part comprises a plurality of pyroelectric thermal detection elements arranged in a line with said pyroelectric thermal detection element to provide a pyroelectric thermal detection element group, said system further comprises a corresponding number of band amplifiers and peak detection sections corresponding to said plurality of pyroelectric thermal detection elements, and output signals from the plurality of peak detection sections are inputted to said operational processing section to obtain a two-dimensional thermal image signal.

3. A thermal image detecting system according to claim 1, wherein said chopper includes closing means for closing the path of infrared rays to said pyroelectric thermal detection element while no current is supplied to said chopper.

4. A thermal image detecting system according to claim 1, wherein said peak detection section comprises a pair of analog peak hold sections for holding said maximum value and said minimum value respectively and a time instant detection section for detecting a temporal relationship in sequence between the detection of the maximum value and the detection of the minimum value.

5. A thermal image detecting system according to claim 1, wherein said peak detection section includes an A/D conversion section for sequentially converting said first temperature detection signal amplified by said band amplifier into a digital value, a pair of digital peak hold sections for holding the digital value outputted by the A/D conversion section as said maximum value when said digital value is larger than preceding values, and for holding said digital value as said minimum value when said digital value is smaller than preceding values, and a time instant detection section for detecting a temporal relationship in sequence between the detection of the maximum value and the detection of the minimum value.

6. A thermal image detecting system according to claim 5, wherein said pair of digital peak hold sections hold an average value between the digital value outputted by said A/D conversion section and a previous maximum value or minimum value as a new maximum value when the digital value outputted by said A/D conversion section is larger than said previous maximum value and as a new minimum value when the digital value outputted by said A/D conversion section is smaller than said previous minimum value.

7. A thermal image detecting system according to claim 1, wherein said peak detection section includes an A/D conversion section for sequentially converting said first temperature detection signal amplified by said band amplifier into a digital value, an average value holding section for obtaining an average value between the preceding output value of said A/D conversion section and the present output value thereof and holding the average value, a pair of digital peak hold sections for detecting and holding the maximum value and the minimum value of an output value of said average value holding section, respectively, and a time instant detection section for detecting a temporal relationship in sequence between the detection of the maximum value and the detection of the minimum value.

8. A thermal image detecting system comprising:
   (a) a moving part including
      (i) a pyroelectric thermal detection element having an electric characteristic which changes in response to infrared rays for generating a first temperature detection signal,
      (ii) a chopper for opening/closing a path along which infrared rays from an object to be detected reach said pyroelectric thermal detection element, and
      (iii) a chopper temperature detection element for detecting a temperature of said chopper to provide a second temperature detection signal which represents the detected temperature of said chopper;
   (b) rotating means for rotating said moving part around a predetermined rotation axis;
   (c) a drive control section for generating a chopper driving signal to drive said chopper and a rotating means driving signal to drive said rotating means;
   (d) a band amplifier for amplifying said first temperature detection signal from said pyroelectric thermal detection element;
   (e) a reference signal detection section for detecting said first temperature detection signal amplified by said band amplifier in a period of time when said chopper is maintained at a closed state by said drive control section;
   (f) timing output means for outputting a synchronized timing signal which is synchronous with an opening/closing operation of said chopper;
   (g) a peak detection section for holding a maximum value and a minimum value of said first temperature detection signal generated by said pyroelectric thermal detection element during a time interval determined by said synchronized timing signal; and an operating processing section for producing a thermal image signal by performing operating processing with said second temperature detection signal and a difference between said reference signal and said maximum value or said minimum value.

9. A thermal image detecting system according to claim 8, wherein said moving part comprises a plurality of pyroelectric thermal detection elements arranged in a line with said pyroelectric thermal detection element to provide a pyroelectric thermal detection element group, said system further comprises a corresponding number of band amplifiers, peak detection sections and reference signal detection sections corresponding to said plurality of pyroelectric thermal detection elements, and output signals from the plurality of reference signal detection sections and the plurality of peak detection sections are inputted to said operational processing section to obtain a two-dimensional thermal image signal.

10. A thermal image detecting system according to claim 8, wherein said timing output means includes means, receiving said chopper driving signal from said drive control section, for outputting said synchronous timing signal.

11. A thermal image detecting system according to claim 8, wherein said moving part includes an opening/closing detection sensor for detecting the opening/closing operation of said chopper, and said timing output means includes means for receiving an opening/closing detection signal from said opening/closing detection sensor and for outputting said synchronous timing signal in response to said opening/closing detection signal.

12. A thermal image detecting system according to claim 8, wherein said chopper includes closing means for closing the path of infrared rays to said pyroelectric thermal detection element while no current is being supplied to said chopper.

13. A thermal image detecting system according to claim 8, wherein said drive control section includes a first timer and a second timer, which operates after completion of a time period of said first timer, so that said drive control section maintains said chopper at a closed state during said time period of said first timer, and provides an output to said reference signal detection section during a time period of said second timer to cause said reference signal detection section to detect a reference signal from said band amplifier, and wherein after completion of the time period of said second timer, said drive control section causes said rotating means to rotate said moving part around said predetermined rotation axis while causing an opening/closing operation of said chopper, said chopper being closed during the time period of the second timer.

14. A thermal image detecting system according to claim 13, wherein the time period of said first timer of said drive control section is at least two times longer than an opening/closing period of said chopper.

15. A thermal image detecting system according to claim 13, wherein said reference signal detection section includes averaging means for receiving a plurality of first temperature detection signals, amplified by said band amplifier, in a closed state of said chopper and for calculating an average value of said plurality of first temperature detection signals amplified by said band amplifier, said average value being provided as the reference signal.

16. A thermal image detecting system according to claim 8, wherein said reference signal detection section includes averaging means for receiving a plurality of first temperature detection signals, amplified by said band amplifier, in a closed state of said chopper and for calculating an average value of said plurality of first temperature detection signals amplified by said band amplifier, said average value being provided as the reference signal.

17. A thermal image detecting system according to claim 8, wherein said timing output means provides said timing signal during a period of time in the vicinity of an instant of time during which a state of said chopper changes from a closed state to an opened state thereof with respect to said opening/closing operation of said chopper, said peak detection section includes polarity detecting means for detecting a polarity of the first temperature detection signal amplified by said band amplifier, and said peak detection section receives said first temperature detection signal, amplified by said band amplifier, in a period of time when said timing output means provides said timing signal and holds the maximum value when the polarity of the first temperature detection signal inputted from said band amplifier is positive and holds the minimum value when the polarity of the first temperature detection signal inputted from said band amplifier is negative.

18. A thermal image detecting system according to claim 8, wherein said peak detection section includes a pair of analog peak hold sections for holding the maximum value and the minimum value of said first temperature detection signal, amplified by said band amplifier, respectively, and a time instant detection section for detecting a temporal relationship in sequence between the detection of the maximum value and the detection of the minimum value.

19. A thermal image detecting system according to claim 8, wherein said peak detection section includes an A/D conversion section for sequentially converting said first temperature detection signal amplified by said band amplifier into a digital value, a pair of digital peak hold sections for holding the digital value outputted by the A/D conversion section as the maximum value when the digital value is larger than preceding values and for holding said digital value as the minimum value when said digital value is smaller than preceding values, and a time instant detection section for detecting a temporal relationship in sequence between the detection of the maximum value and the detection of the minimum value.

20. A thermal image detecting system according to claim 19, wherein said pair of digital peak hold sections hold an average value between the digital value outputted by said A/D conversion section and a previous maximum value or minimum value as a new maximum value when the digital value outputted by said A/D conversion section is larger than the previous maximum value and as a new minimum value when the digital value outputted by said A/D conversion section is smaller than the previous minimum value.

21. A thermal image detecting system according to claim 8, wherein said peak detection section includes an A/D conversion section for sequentially converting said first temperature detection signal amplified by said band amplifier into a digital value, an average value holding section for obtaining an average value between a preceding digital value outputted by said A/D conversion section and a present digital value thereof and holding the average value, a pair of digital peak hold sections for detecting and holding the maximum value and the minimum value of an output value of said average value holding section, respectively, and a time instant detection section for detecting a temporal relationship in sequence between the detection of the maximum value and the detection of the minimum value.

* * * * *